(12) United States Patent
Isomichi et al.

(10) Patent No.: US 11,411,244 B2
(45) Date of Patent: *Aug. 9, 2022

(54) ALL-SOLID SECONDARY BATTERY

(71) Applicant: TDK CORPORATION, Tokyo (JP)

(72) Inventors: Gakuho Isomichi, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 79 days.

This patent is subject to a terminal disclaimer.

(21) Appl. No.: 16/490,940

(22) PCT Filed: Mar. 29, 2018

(86) PCT No.: PCT/JP2018/013139
§ 371 (c)(1),
(2) Date: Sep. 4, 2019

(87) PCT Pub. No.: WO2018/181674
PCT Pub. Date: Oct. 4, 2018

(65) Prior Publication Data
US 2020/0020976 A1    Jan. 16, 2020

(30) Foreign Application Priority Data

Mar. 30, 2017  (JP) .............................. JP2017-066682

(51) Int. Cl.
*H01M 10/00* (2006.01)
*H01M 10/0562* (2010.01)
(Continued)

(52) U.S. Cl.
CPC ......... *H01M 10/0562* (2013.01); *C01B 25/45* (2013.01); *H01M 10/0525* (2013.01);
(Continued)

(58) Field of Classification Search
CPC ......... H01M 10/0562; H01M 10/0525; H01M 10/0585; H01M 2300/0068; H01M 10/052; C01B 25/45; C01P 2002/72; C01P 2004/03; C01P 2004/38; C01P 2006/40; Y02E 60/10; H01B 1/06
See application file for complete search history.

(56) References Cited

U.S. PATENT DOCUMENTS

2010/0028782 A1 * 2/2010 Inda .................. H01M 10/0562
429/305
2011/0244337 A1   10/2011 Ohta et al.
(Continued)

FOREIGN PATENT DOCUMENTS

CN      104600356 A    5/2015
EP       3428929 A1    1/2019
(Continued)

OTHER PUBLICATIONS

Jun. 5, 2018 International Search Report issued in International Patent Application No. PCT/JP2018/013139.
(Continued)

*Primary Examiner* — Nicholas P D'Aniello
(74) *Attorney, Agent, or Firm* — Oliff PLC

(57) ABSTRACT

A solid electrolyte according to an embodiment includes a lithium-containing phosphoric acid compound with a cubic crystal structure.

11 Claims, 3 Drawing Sheets

(51) Int. Cl.
  *C01B 25/45* (2006.01)
  *H01M 10/0525* (2010.01)
  *H01M 10/0585* (2010.01)

(52) U.S. Cl.
  CPC ..... *H01M 10/0585* (2013.01); *C01P 2002/72* (2013.01); *C01P 2004/03* (2013.01); *C01P 2004/38* (2013.01); *C01P 2006/40* (2013.01); *H01M 2300/0068* (2013.01)

(56) References Cited

U.S. PATENT DOCUMENTS

| | | | |
|---|---|---|---|
| 2012/0231350 A1* | 9/2012 | Nishida | H01M 10/052 429/322 |
| 2012/0308900 A1 | 12/2012 | Ogasa | |
| 2012/0328959 A1 | 12/2012 | Hayashi et al. | |
| 2013/0273437 A1 | 10/2013 | Yoshioka et al. | |
| 2014/0134504 A1* | 5/2014 | Brown | H01M 8/1004 429/403 |
| 2014/0197351 A1 | 7/2014 | Balagopal et al. | |
| 2015/0064576 A1 | 3/2015 | Aitken et al. | |
| 2015/0118573 A1* | 4/2015 | Yokoyama | H01M 10/0562 429/322 |
| 2015/0333366 A1 | 11/2015 | Sato et al. | |
| 2016/0141716 A1 | 5/2016 | Ito et al. | |
| 2016/0164135 A1 | 6/2016 | Fasching et al. | |
| 2019/0067736 A1* | 2/2019 | Yoshioka | H01M 10/0562 |
| 2021/0036362 A1 | 2/2021 | Ueno et al. | |

FOREIGN PATENT DOCUMENTS

| | | |
|---|---|---|
| JP | H02-250264 A | 10/1990 |
| JP | H03-081908 A | 4/1991 |
| JP | H05-299101 A | 11/1993 |
| JP | 2001-143754 A | 5/2001 |
| JP | 2010-202499 A | 9/2010 |
| JP | 2010-272344 A | 12/2010 |
| JP | 2011-070939 A | 4/2011 |
| JP | 2012-246196 A | 12/2012 |
| JP | 2013-149493 A | 8/2013 |
| JP | 2015-065022 A | 4/2015 |
| JP | 2015-076324 A | 4/2015 |
| JP | 2015-216220 A | 12/2015 |
| JP | 2015-216221 A | 12/2015 |
| JP | 2016-001595 A | 1/2016 |
| JP | 2016-051539 A | 4/2016 |
| WO | 2012/008422 A1 | 1/2012 |
| WO | 2017/154922 A1 | 9/2017 |

OTHER PUBLICATIONS

Jun. 12, 2018 Search Report issued in International Patent Application No. PCT/JP2018/013452.
Jun. 3, 2020 Office Action issued in Chinese Patent Application No. 201880021434.6.
Apr. 14, 2021 Office Action Issued in U.S. Appl. No. 16/491,036.
Jul. 3, 2018 International Search Report issued in International Patent Application No. PCT/JP2018/013486.
Mar. 19, 2021 U.S. Office Action issued U.S. Appl. No. 16/497,624.
Jul. 23, 2021 Office Action Issued in U.S. Appl. No. 16/497,624.
Jul. 3, 2018 Search Report issued in International Patent Application No. PCT/JP2018/013477.
Apr. 2, 2021 Office Action issued in U.S. Appl. No. 16/490,861.
Aug. 3, 2021 Office Action Issued in U.S. Appl. No. 16/490,861.
U.S. Appl. No. 16/490,861, filed Sep. 3, 2019 in the name of Sasaki et al.
U.S. Appl. No. 16/491,036, filed Sep. 4, 2019 in the name of Sasaki et al.
U.S. Appl. No. 16/497,624, filed Sep. 25, 2019 in the name of Sasaki et al.
Aug. 3, 2021 Office Action Issued in U.S. Appl. No. 16/491,036.
Dec. 13, 2021 Office Action issued in U.S. Appl. No. 16/490,861.
Nov. 30, 2021, Non-Final Office Action Issued in U.S. Appl. No. 16/497,624.
Translation of Sep. 21, 2021 Office Action issued in Japanese Application No. 2019-510194.
Translation of Sep. 21, 2021 Office Action issued in Japanese Application No. 2019-510197.
Nov. 18, 2021 Office Action issued in U.S. Appl. No. 16/491,036.
Translation of May 10, 2022 Office Action issued in Japanese Application No. 2019-510185.
Jun. 3, 2022 Office Action Issued in U.S. Appl. No. 16/490,861.
Apr. 5, 2022 Office Action Issued in U.S. Appl. No. 16/497,624.
Apr. 11, 2022 Office Action Issued In U.S. Appl. No. 16/491,036.
Translation of Mar. 18, 2022 Office Action issued in Chinese Application No. 201880021444.X.
Translation of Mar. 22, 2022 Office Action issued in German Application No. 112018001797.4.
Translation of Mar. 22, 2022 Office Action iissued n German Application No. 112018001798.2.
Translation of Mar. 23, 2022 Office Action issued in German Application No. 112018001738.9.

* cited by examiner

ALL-SOLID SECONDARY BATTERY

TECHNICAL FIELD

The present invention relates to a solid electrolyte and an all-solid secondary battery.

The application is based upon and claims the benefit of priority from Japanese Patent Application No. 2017-66682, filed Mar. 30, 2017, the entire contents of which are incorporated herein by reference.

BACKGROUND ART

In recent years, batteries have been used for various purposes. Batteries have also been used as mobile phone batteries, for example, and have been required to have reduced sizes and weights, reduced film thickness, and improved reliability. Batteries using electrolyte solutions have problems such as liquid leakage and liquid depletion. Thus, all-solid secondary batteries using solid electrolytes have drawn attention.

Meanwhile, all-solid secondary batteries have a problem that outputs thereof are smaller than those of batteries using electrolytes. Thus, there has been a demand for an increase in degree of ion conductivity of all-solid secondary batteries.

For example, Patent Document 1 discloses an all-solid secondary battery using, as a solid electrolyte, the oxide-based $Li_{1.3}Al_{0.3}Ti_{1.7}(PO_4)_3$. Also, Patent Document 2 discloses an all-solid secondary battery using, as a solid electrolyte, $LiZr_2(PO_4)_3$ containing Zr with excellent reduction resistance. Further, Patent Document 3 discloses an all-solid secondary battery that has excellent reduction resistance and uses particles in which $Li_{1.55}Al_{0.2}Zr_{1.7}Y_{0.1}Si_{0.25}P_{2.75}O_{12}$ rhombohedral crystals are composited.

CITATION LIST

Patent Literature

[Patent Document 1]
Japanese Unexamined Patent Application, First Publication No. 2016-1595
[Patent Document 2]
Japanese Unexamined Patent Application, First Publication No. 2001-143754
[Patent Document 3]
Japanese Unexamined Patent Application, First Publication No. 2012-246196

SUMMARY OF INVENTION

Technical Problem

However, the solid electrolytes disclosed in Patent Documents 1 to 3 are triclinic or rhombohedral crystals, and it is not possible to state that ion conductivities thereof are sufficient.

The invention was made in view of the aforementioned problem, and an object thereof is to provide a solid electrolyte with high ion conductivity and an all-solid secondary battery using the same.

Solution to Problem

The present inventors found that an all-solid secondary battery with excellent ion conductivity was able to be obtained using a solid electrolyte including a lithium-containing phosphoric acid compound which is a cubic crystal.

That is, the invention provides the following means in order to solve the aforementioned problem.

(1) According to a first aspect, there is provided a solid electrolyte including: a lithium-containing phosphoric acid compound with a cubic crystal structure.

(2) In the solid electrolyte according to the aforementioned aspect, the lithium-containing phosphoric acid compound which is a cubic crystal that is included in the solid electrolyte may be represented as: $Li_xM1_yM2_zM3_wP_{3-w}O_{12}$ ... (1), $0<x\le3$, $0\le y<2$, $0<z\le2$, and $0\le w<3$ may be satisfied in Formula (1), M1 may represent at least one selected from the group consisting of Mg, Ca, Sr, Ba, V, Nb, Mn, Co, Ni, Cu, Ag, Ga, Al, In, Sc, and Y, M2 may represent at least one selected from the group consisting of Zr and Hf, and M3 may represent at least one selected from the group consisting of Si, B, S, V, Mo, and W.

(3) The solid electrolyte according to the aforementioned aspect may further include: equal to or greater than 0.01% by mass and equal to or less than 20% by mass of bound water.

(4) In the solid electrolyte according to the aforementioned aspect, a measurement value (D50) obtained through particle size distribution measurement may be equal to or greater than 0.1 μm and equal to or less than 10 μm.

(5) According to a second aspect, there is provided an all-solid secondary battery including: the solid electrolyte according to the aforementioned aspect.

(6) In the all-solid secondary battery according to the aforementioned second aspect, a relative density of a pair of electrode layers and a solid electrolyte layer with the solid electrolyte that is provided between the pair of electrode layers may be equal to or greater than 80%.

Advantageous Effects of Invention

According to the solid electrolyte in the aforementioned aspects, it is possible to enhance ion conductivity. Also, according to the all-solid secondary battery using the solid electrolyte according to the aforementioned aspects, it is possible to reduce voltage loss and to enhance capacity.

DESCRIPTION OF EMBODIMENTS

Hereinafter, the invention will be described in detail with reference to drawings as needed. The drawings used in the following description may show characteristic portions in an enlarged manner for easy understanding of the characteristics of the invention, and dimensional ratios and the like of the respective components may differ from actual dimensional ratios. The materials, dimensions, and the like in the following description are just exemplary examples, and the invention is not limited thereto and can be appropriately modified and realized without changing the gist thereof.

[All-Solid Secondary Battery]

Figure 1:
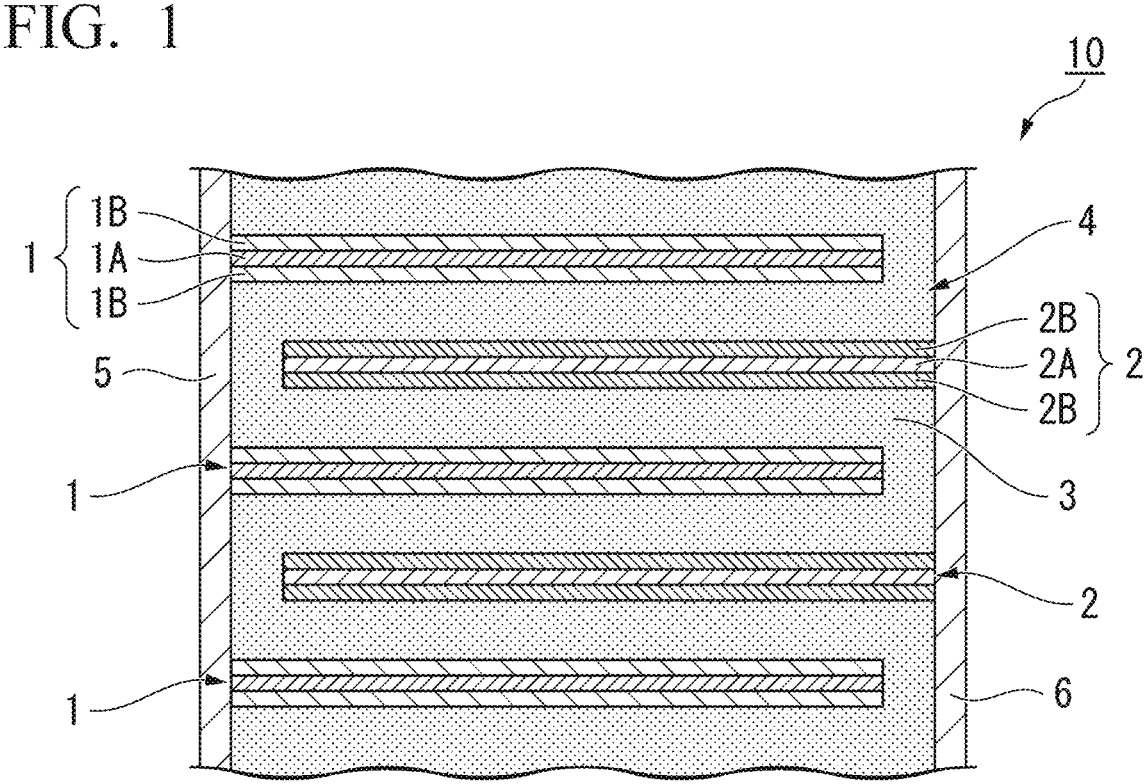
FIG. 1 is a sectional schematic view showing main components of an all-solid secondary battery according to an embodiment in an enlarged manner.

FIG. 1 is a sectional schematic view showing main components of an all-solid secondary battery according to a first embodiment in an enlarged manner. As shown in FIG. 1, an all-solid secondary battery 10 includes a layered body 4 having first electrode layers 1, second electrode layers 2, and a solid electrolyte 3.

Each of the first electrode layers 1 is connected to a first external terminal 5, and each of second electrode layers 2 is connected to a second external terminal 6. The first external terminal 5 and the second external terminal 6 are electrical contact points with the outside.

(Layered Body)

The layered body 4 has the first electrode layers 1, the second electrode layers 2, and the solid electrolyte 3. Either the first electrode layers 1 or the second electrode layers 2 function as positive electrodes, and the others function as negative electrodes. Positive and negative polarities of the electrode layers change depending on which of polarities is connected to the external terminals. Hereinafter, it is assumed that the first electrode layers 1 function as positive electrode layers 1 and the second electrode layers 2 function as negative electrode layers 2 for easy understanding.

In the layered body 4, the positive electrode layers 1 and the negative electrode layers 2 are alternately layered via the solid electrolyte 3. The all-solid secondary battery 10 is charged and discharged through exchange of lithium ions between the positive electrode layers 1 and the negative electrode layers 2 via the solid electrolyte 3.

"Solid Electrolyte"

The solid electrolyte 3 according to the embodiment includes a lithium-containing phosphoric acid compound with a cubic crystal structure. Although a lithium-containing phosphoric acid compound which is a rhombohedral crystal or a triclinic crystal that can be used for the solid electrolyte 3 is known, a lithium-containing phosphoric acid compound which is a cubic crystal is not known.

The lithium-containing phosphoric acid compound with a cubic crystal structure has excellent ion conductivity. This is thought to be because symmetricity of the cubic crystal is high. In the cubic crystal, lengths of primitive vectors (a1, a2, a3) of a unit lattice are equal to each other and perpendicularly intersect one another, and the symmetricity thereof is high.

When the all-solid secondary battery 10 is charged or discharged, ions move through clearances between atoms that are included in the crystal structure. In the crystal structure with high symmetricity, positions at which the clearances are present tend to be three-dimensionally symmetric. That is, it is thought to be because conducting paths of the ions introduced into the crystal are present in a three-dimensionally equivalent manner and this promotes ion conduction in the cubic crystal structure with high symmetricity.

Meanwhile, lengths of primitive vectors (a1, a2, a3) of a unit lattice are equal to each other but do not perpendicularly intersect one another in a rhombohedral crystal. Also, lengths of primitive vectors (a1, a2, a3) of a unit lattice differ from each other and do not perpendicularly intersect one another in a triclinic crystal. That is, it is thought that rhombohedral and triclinic structures have poor symmetricity and that conducting paths of ions are limited as compared with in a cubic crystal.

The solid electrolyte 3 according to the embodiment includes a lithium-containing phosphoric acid compound. The solid electrolyte 3 according to the embodiment is preferably a material with excellent ion conductivity and is preferably represented by Formula (1) below:

$$Li_xM1_yM2_zM3_wP_{3-w}O_{12} \quad (1),$$

Formula (1) satisfies $0<x\le3$, $0\le y<2$, $0<z\le2$, and $0\le w<3$, M1 in Formula (1) represents at least one selected from a group consisting of Mg, Ca, Sr, Ba, V, Nb, Mn, Co. Ni, Cu, Ag, Ga, Al, In, Sc, and Y, M2 in Formula (1) represents at least one selected from a group consisting of Zr and Hf, and M3 in Formula (1) represents at least one selected from a group consisting of Si, B, S, V, Mo, and W.

A cubic structure can be selected for the substance represented by Formula (1). Also, the substance represented by Formula (I) is adapted such that it is possible to easily cause defects in the crystal structure by causing ionic radii of constituent elements, valences of the constituent elements, and the like to vary. The defects create vacancies or ions that serve as carriers of the solid electrolyte and enhance ion conductivity.

Figure 2:
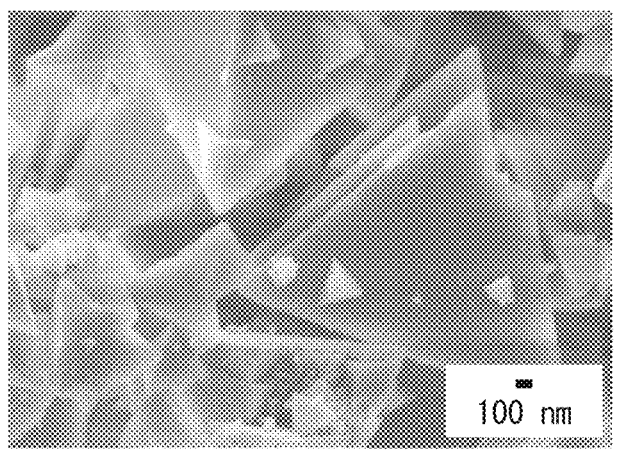
FIG. 2 is a scanning electron microscope (SEM) image of a cubic monocrystalline particle that is included in a solid electrolyte according to the embodiment.

Also, the phosphoric acid-containing compound which is the cubic crystal is preferably monocrystalline particles with regular tetrahedron particle shapes. FIG. 2 is a scanning electron microscope (SEM) image of a monocrystalline particle which is a cubic crystal that is included in the solid electrolyte according to the embodiment.

Figure 3A:
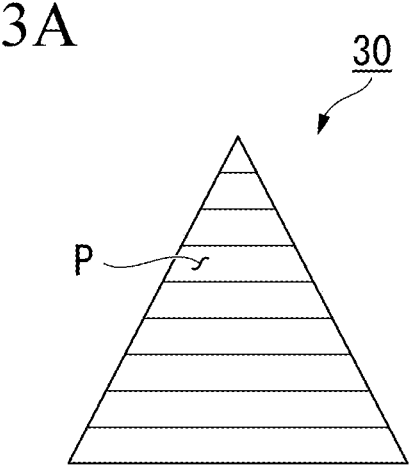
FIG. 3A is a diagram schematically showing an ion conducting path in the monocrystalline particle that is included in the solid electrolyte.
Figure 3B:
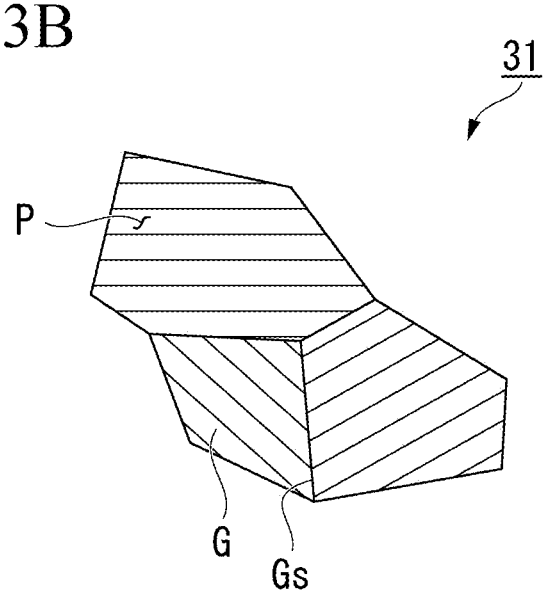
FIG. 3B is a diagram schematically showing an ion conducting path in a random shape particle that is included in the solid electrolyte.

FIG. 3A is a diagram schematically showing a conducting path of an ion in the monocrystalline particle that is included in the solid electrolyte, and FIG. 3B is a diagram schematically showing a conducting path of an ion in a random shape particle that is included in the solid electrolyte. The random shape particle is one particle obtained through sintering after pulverization and is a composite body in which a plurality of crystals are composited.

As shown in FIG. 3A, the monocrystalline particle 30 has a path P through which ions are conducted. The path P is present between atoms that are included in the monocrystalline particle 30. Although the path P is schematically shown on one axis in FIG. 3A, the path P is actually present in a three-dimensional manner in the monocrystalline particle 30.

Since the monocrystalline particle 30 is formed to include one single crystal, the path P continues in a particle. That is, ions can smoothly move in the monocrystalline particle 30 when the all-solid secondary battery 10 is charged or discharged.

Meanwhile, a plurality of grain boundaries Gs are present inside the random shape particle 31 of a plurality of composited crystals as shown in FIG. 3B. Each grain G sectioned by the grain boundaries Gs in the random shape particle 31 has a crystalline nature. Therefore, each grain G has the path P through which ions are conducted. However, since a direction of the path P differs for each grain G, there is a case in which ion conduction is disturbed at the grain boundary Gs.

That is, the monocrystalline particle 30 in FIG. 3A has superior ion conductivity to that of the random shape particle 31 in FIG. 3B. The monocrystalline particle 30 of a grown crystal does not become amorphous unlike the random shape particle 31 as shown in FIG. 3B.

Note that whether or not a particle that is included in the solid electrolyte 3 has a regular tetrahedron shape is determined from an SEM image. The regular tetrahedron shape is not limited to a completely regular tetrahedron shape and also includes a substantially regular tetrahedron shape. The substantially regular tetrahedron shape includes a shape with a projecting portion or a recessed portion at a part of a surface, a shape with a partially lacking corner, and a combined body of a plurality of regular tetrahedron shapes partially connected to each other.

A measurement value (D50) obtained through particle size distribution measurement performed on the solid electrolyte 3 is preferably equal to or greater than 0.1 μm and equal to or less than 10 μm and is more preferably from 0.3 to 9 μm. Here, D50 is a diameter of a particle at a cumulative value of 50% in a distribution curve obtained through the particle size distribution measurement. The grain size distribution of the particles can be measured using a particle size distribution measurement device using a laser diffraction scattering method (Microtrac method).

If the particles that are included in the solid electrolyte 3 fall within this range, it is possible to cause the solid electrolyte to be dense and to enhance ion conductivity. Also, heat conductivity with respect to each particle becomes uniform during the sintering by the particle diameters of the particles being the same, and it is thus possible to lower the sintering temperature. As a result, it is possible to prevent volatilization of Li and to maintain the number of conductive carriers.

Also, the solid electrolyte 3 preferably includes equal to or greater than 0.01% by mass and equal to or less than 20% by mass of bound water. The bound water is bound to constituent components of the solid electrolyte 3 at a molecular level. If the bound water is present, it is possible to more stably maintain the cubic crystal structure. Although the reason for this is not obvious, this is thought to be because O element that is shared by tetrahedrons formed by P element and O element, an octahedron formed by Zr element and O element, and H element in the bound water form hydrogen bonds and are present in the crystal structure. Also, it has also been confirmed through calculation that an enthalpy of formation of the cubic crystal is stabilized by the bound water being contained. In addition, it has been confirmed from results of FT-IR (infrared spectroscopy) that the bound water also affects symmetricity of a $PO_4$ bond.

Also, if the bound water is present, there is a probability that a concentration gradient of elements in the solid electrolyte will occur between a portion where the bound water is present and the other portions. It is thought that if the concentration gradient of the elements is present, ions are conducted along the concentration gradient and the ion conductivity is enhanced.

Whether or not a substance is "bound water" is checked by measuring a mass spectrum of the solid electrolyte 3 with water content. The amount of detected substance (that is, $H_2O$) with an m/z value of 18 is measured while the solid electrolyte 3 is heated in vacuum and the temperature is gradually raised. Since the bound water is bound to constituent molecules of the solid electrolyte 3, the bound water is not desorbed at a temperature of equal to or less than 100° C. Meanwhile, adsorbed water that is merely adsorbed on the solid electrolyte 3 is desorbed at a temperature of equal to or less than 100° C. Therefore, it is possible to confirm the presence of "bound water" according to the presence of water that has been desorbed at a temperature of equal to or greater than 100° C. In addition, it is also possible to obtain a ratio between adsorbed water and bound water of the water content contained in the solid electrolyte 3.

"Positive Electrode Layer and Negative Electrode Layer"

The positive electrode layer 1 has a positive electrode current collector layer 1A and a positive electrode active material layer 1B that contains a positive electrode active material. The negative electrode layer 2 has a negative electrode current collector layer 2A and a negative electrode active material layer 2B that contains a negative electrode active material.

The positive electrode current collector layer 1A and the negative electrode current collector layer 2A preferably have high electroconductivities. Therefore, it is preferable to use, for example, silver, palladium, gold, platinum, aluminum, copper, nickel, or the like for the positive electrode current collector layer 1A and the negative electrode current collector layer 2A. Among these substances, it is difficult for cupper to react with the positive electrode active material, the negative electrode active material, and the solid electrolyte. Therefore, if copper is used for the positive electrode current collector layer 1A and the negative electrode current collector layer 2A, it is possible to reduce an internal resistance of the all-solid secondary battery 10. Note that the substances that are included in the positive electrode current collector layer 1A and the negative electrode current collector layer 2A may be the same or different from each other.

The positive electrode active material layer 1B is formed on one surface or both surfaces of the positive electrode current collector layer 1A. For example, there is no negative electrode layer 2 facing the positive electrode layer 1 located at the uppermost layer of the all-solid secondary battery 10 in a lamination direction. Therefore, it is only necessary for the positive electrode active material layer 1B to be provided on one surface on the lower side in the lamination direction, in the positive electrode layer 1 located on the uppermost layer of the all-solid secondary battery 10. The negative electrode active material layer 2B is also formed on one surface or both surfaces of the negative electrode current collector layer 2A similarly to the positive electrode active material layer 1B.

The positive electrode active material layer 1B and the negative electrode active material layer 2B include a positive electrode active material and a negative electrode active material that exchange electrons. In addition to them, the positive electrode active material layer 1B and the negative electrode active material layer 2B may contain an electroconductive aid, a binder, and the like. The positive electrode active material and the negative electrode active material are preferably adapted such that lithium ions can efficiently be intercalation and de-intercalation.

It is preferable to use a transition metal oxide or a transition metal composite oxide, for example, for the positive electrode active material and the negative electrode active material. Specifically, it is possible to use a lithium manganese composite oxide $Li_2Mn_aMa_{1-a}O_3$ (0.8≤a≤1, Ma=Co, Ni), lithium cobaltate ($LiCoO_2$), lithium nickelate ($LiNiO_2$), lithium manganese spinel ($LiMn_2O_4$), a composite metal oxide represented by a formula: $LiNi_xCo_yMn_zO_2$ (x+y+z=1, 0≤x≤1, 0≤y≤1, 0≤z≤1), a lithium vanadium compound ($LiV_2O_5$), olivine-type $LiMbPO_4$ (where Mb is one or more kinds of element selected from Co, Ni, Mn, Fe, Mg, Nb, Ti, Al, and Zr), lithium vanadium phosphate ($Li_3V_2(PO_4)_3$ or $LiVOPO_4$), an Li excess solid solution positive electrode represented as $Li_2MnO_3$—$LiMcO_2$ (Mc=Mn, Co, Ni), lithium titanate ($Li_4Ti_5O_{12}$), a composite metal oxide represented as $Li_sNi_tCo_uAl_vO_2$ (0.9<s<1.3, 0.9<t+u+v<1.1), or the like.

Also, the negative electrode active material and the positive electrode active material may be selected in accordance with the solid electrolyte 3.

In a case in which the compound of Formula (1) is used for the solid electrolyte 3, for example, it is preferable to use one of or both $LiVOPO_4$ and $Li_3V_2(PO_4)_3$ for the positive electrode active material and the negative electrode active material. This is because joining at an interface of the positive electrode active material layer 1B, the negative electrode active material layer 2B, and the solid electrolyte 3 becomes strong. Also, this is because it is possible to increase a contact area at the interface of the positive electrode active material layer 1B, the negative electrode active material layer 2B, and the solid electrolyte 3.

There is no clear distinction between active materials that are included in the positive electrode active material layer 1B and the negative electrode active material layer 2B, and it is possible to use a compound exhibiting a superior potential as the positive electrode active material and to use a compound exhibiting an inferior potential as the negative electrode active material by comparing potentials of the two types of compound.

Also, each of the positive electrode current collector layer 1A and the negative electrode current collector layer 2A may contain the positive electrode active material and the negative electrode active material. The amount of the active materials contained in each of the current collectors is not particularly limited as long as they function as current collectors. For example, the positive electrode current collector/the positive electrode active material or the negative electrode current collector/the negative electrode active material preferably falls within a range from 90/10 to 70/30 in terms of the volume ratio.

Adhesiveness between the positive electrode current collector layer 1A and the positive electrode active material layer 1B and between the negative electrode current collector layer 2A and the negative electrode active material layer 2B is enhanced by each of the positive electrode current collector layer 1A and the negative electrode current collector layer 2A including the positive electrode active material and the negative electrode active material.

(Terminals)

It is preferable to use a material with high electroconductivity for the first external terminal 5 and the second external terminal 6 of the all-solid secondary battery 10. For example, it is possible to use silver, gold, platinum, aluminum, copper, tin, or nickel. The first external terminal 5 and the second external terminal 6 may have a single layer or a plurality of layers.

(Protective Layer)

Also, the all-solid secondary battery 10 may have a protective layer that electrically, physically, and chemically protects the layered body 4 and the terminals at an outer periphery of the layered body 4. A material that is included in the protective layer preferably has excellent insulating properties, durability, and moisture resistance and is preferably environmentally safe. For example, it is preferable to use glass, ceramics, a thermosetting resin, or a photocurable resin. One kind of material may be used alone, or a plurality of materials may be used together for the protective layer. Also, although the protective layer may have a single layer, the protective layer preferably includes a plurality of layers. Among them, an organic-inorganic hybrid layer in which a thermosetting resin and a ceramic powder are mixed is particularly preferably used.

As described above, the solid electrolyte according to the embodiment contains a lithium-containing phosphoric acid compound that is a cubic crystal. The ion conducting paths are three-dimensionally equivalently present in the cubic crystal with high symmetry, and excellent ion conductivity is achieved. Also, the all-solid secondary battery produced using the solid electrolyte can be used with the active material that leads to less voltage loss at the solid electrolyte and has energy contributing to the capacity. Therefore, it is possible to enhance the capacity of the all-solid secondary battery.

"Manufacturing Method"

(Method for Manufacturing Lithium-Containing Phosphoric Acid Compound which is Cubic Crystal)

The lithium-containing phosphoric acid compound which is a cubic crystal can be produced by various methods. For example, it is possible to use a solid phase method, a liquid phase method, a water heating method, a reflux method, or the like.

In a case of using a liquid phase synthesis method, for example, a compound containing elements that are included in the solid electrolyte is dissolved in water. At this time, the amount of the compound to be dissolved in water is obtained from the element ratio of the obtained solid electrolyte. Thereafter, a nucleus of a single crystal is generated, and the monocrystalline particles 30 are generated by gradually lowering the temperature of a solvent. It is possible to selectively produce the lithium-containing phosphoric acid compound which is a cubic crystal by adjusting the temperature from which the solvent is gradually cooled. Also, it is possible to selectively produce the lithium-containing phosphoric acid compound of a cubic crystal by adjusting the temperature during heating also in the solid phase method, the water heating method, the reflux method, and the like.

(Method for Manufacturing all-Solid Secondary Battery)

As a method for manufacturing the all-solid secondary battery 10, a simultaneous firing method may be used, or a sequential firing method may be used.

The simultaneous firing method is a method of laminating materials that form the respective layers and producing a layered body through collective firing. The sequential firing method is a method of producing the respective layers in order, and firing process is performed every time each layer is produced. It is possible to further reduce the number of operation steps for the all-solid secondary battery 10 by using the simultaneous firing method. Also, the obtained layered body 4 becomes finer by using the simultaneous firing method. Hereinafter, the case of using the simultaneous firing method will be described as an example.

The simultaneous firing method has a process of producing pastes of the respective materials that are included in the layered body 4, a process of applying and drying the pastes to produce green sheets, and a process of laminating the green sheets and simultaneously firing the produced laminated sheet.

First, the respective materials for the positive electrode current collector layer 1A, the positive electrode active material layer 1B, the solid electrolyte 3, the negative electrode active material layer 2B, and the negative electrode current collector layer 2A that are included in the layered body 4 are prepared in the form of pastes.

A method of preparing them in the form of pastes is not particularly limited. For example, pastes may be obtained by mixing powder of the respective materials into vehicles. Here, the vehicles collectively refer to mediums in a liquid phase. The vehicles contain solvents and binders. The paste for the positive electrode current collector layer 1A, the paste for the positive electrode active material layer 1B, the paste for the solid electrolyte 3, the paste for the negative electrode active material layer 2B, and the paste for the negative electrode current collector layer 2A are produced by such a method.

Then, green sheets are produced. The green sheets are obtained by applying the produced pastes to a base material such as polyethylene terephthalate (PET) or the like in a desired order, drying the pastes as needed, and peeling the base material. A method for applying the pastes is not particularly limited. For example, a known method such as screen printing, application, transferring, or a doctor blade can be employed. The monocrystalline particle 30 may be oriented or aligned during the application of the pastes.

Each of the produced green sheets is laminated in accordance with a desired order and a desired number of layers laminated. Alignment, cutting, or the like is performed as needed, thereby producing a layered body. In a case in which a parallel-type or serial-parallel-type battery is produced, it is preferable to perform alignment and laminate the layers such that an end surface of the positive electrode current collector layer does not conform to an end surface of the negative electrode current collector layer.

A positive electrode active material layer unit and a negative electrode active material layer unit, which will be described below, may be prepared before the layered body is produced, and the layered body may then be prepared.

First, the paste for the solid electrolyte 3 is formed into a sheet shape by the doctor blade method on the PET film and is dried, thereby forming the solid electrolyte 3. The paste for the positive electrode active material layer 1B is printed on the obtained solid electrolyte 3 by screen printing and is dried, thereby forming the positive electrode active material layer 1B.

Then, the paste for the positive electrode current collector layer 1A is printed on the produced paste for the positive electrode active material layer 1B by screen printing and is dried, thereby forming the positive electrode current collector layer 1A. The paste for the positive electrode active material layer 1B is printed again on the obtained positive electrode current collector layer 1A by screen printing and is dried, thereby forming the positive electrode active material layer 1B. Then, the positive electrode active material layer unit is produced by peeling off the PET film. In the positive electrode active material layer unit, the solid electrolyte 3, the positive electrode active material layer 1B, the positive electrode current collector layer 1A, and the positive electrode active material layer 1B are laminated in this order.

The negative electrode active material layer unit is also produced in a similar procedure. In the negative electrode active material layer unit, the solid electrolyte 3, the negative electrode active material layer 2B, the negative electrode current collector layer 2A, and the negative electrode active material layer 2B are laminated in this order.

One positive electrode active material layer unit and one negative electrode active material layer are laminated. At this time the one positive electrode active material layer unit and the one negative electrode active material layer are laminated such that the solid electrolyte 3 in the positive electrode active material layer unit is in contact with the negative electrode active material layer 2B in the negative electrode active material layer unit or the positive electrode active material layer 1B in the positive electrode active material layer unit is in contact with the solid electrolyte 3 in the negative electrode active material layer unit. In this manner, a layered body in which the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 are laminated in this order is obtained. The respective units are stacked in a deviating manner such that the positive electrode current collector layer 1A in the first positive electrode active material layer unit extends only toward one end surface and the negative electrode current collector layer 2A in the second negative electrode active material layer unit extends only toward the other surface. Sheets for the solid electrolyte 3 with a predetermined thickness are further stacked on both surfaces of the stacked units, thereby producing the layered body.

The produced layered body is collectively pressure-bonded. The pressure bonding is performed while heating the layered body, and the heating temperature is set to 40 to 95° C., for example.

The pressure-bonded layered body is heated and fired at 600° C. to 1000° C. in a nitrogen atmosphere, for example, thereby obtaining a sintered body. The firing time is set to 0.1 to 3 hours, for example.

The sintered body may be placed in a cylindrical container along with a polishing material such as alumina and may be subject to barrel polishing. In this manner, it is possible to chamfer corners of the layered body. As another method, the layered body may be polished by sand blasting. This method is preferably employed since only specific portions can be ground.

In the aforementioned sintered body, a relative density of the pair of electrode layers and the solid electrolyte layer that has the solid electrolyte 3 provided between the pair of electrode layers may be equal to or greater than 80%. This is because diffusion paths of movable ions in the crystal further tend to be better connected to each other and ion conductivity is further enhanced when the relative density is higher.

(Terminal Formation)

The first external terminal 5 and the second external terminal 6 are attached to the layered body 4. The first external terminal 5 and the second external terminal 6 are formed such that they are respectively brought into electrical contact with the positive electrode current collector layer 1A and the negative electrode current collector layer 2A. For example, it is possible to form the first external terminal 5 and the second external terminal 6 using a known method such as a sputtering method, a dipping method, or a spray coating method on the positive electrode current collector layer 1A and the negative electrode current collector layer 2A exposed from side surfaces of the layered body 4. When the first external terminal 5 and the second external terminal 6 are formed only at predetermined portions, they are formed by applying masking with tape, for example.

Although the embodiments of the invention have been described above in detail with reference to the drawings, the respective configurations, the combinations thereof, and the like in each embodiment are just examples, and addition, omission, replacement, and other changes of the configurations can be made without departing from the gist of the invention.

EXAMPLES

Example 1

Figure 4:
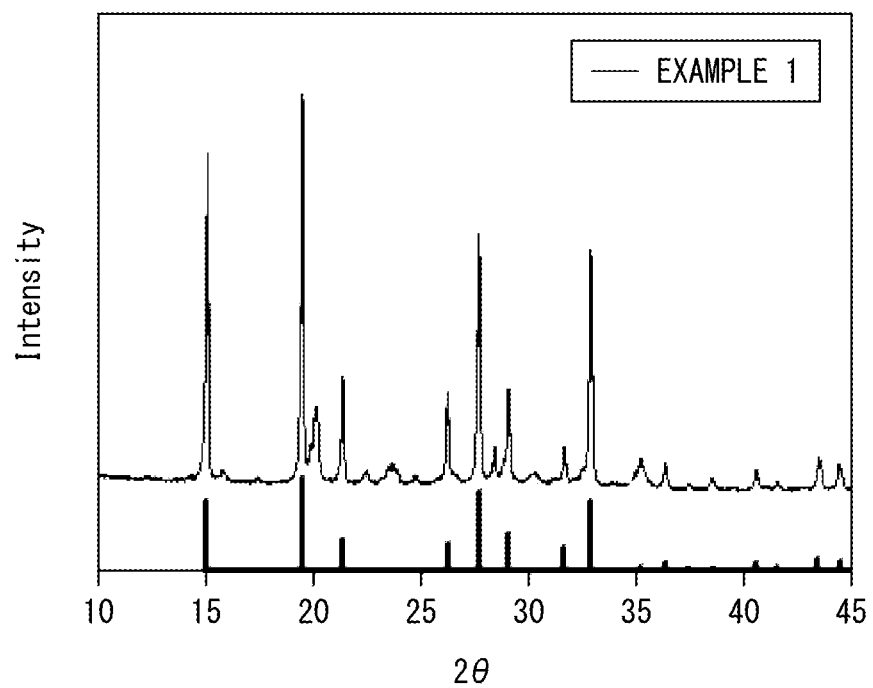
FIG. 4 is an X-ray diffraction (XRD) image in Example 1.

$LiZr_2(PO_4)_3$ was produced in the following procedure. First, each of $LiOH \cdot H_2O$, $ZrO(NO_3)_2$, and $NH_4(H_2PO_4)$ were weighed out at a weighing ratio and were dissolved in water. The respective solutions were mixed, were heated to 20° C. after the pH was adjusted, and were gradually cooled. Also, X-ray crystal diffraction was performed on the produced compound. FIG. 4 shows an X-ray diffraction (XRD) image in Example 1. As shown in FIG. 4, the solid electrolyte in Example 1 has a peak at a position corresponding to a cubic crystal structure, and it was confirmed that the solid electrolyte is a cubic crystal.

Then, each of grain size distribution, a degree of ion conductivity, and a content of the bound water of the obtained solid electrolyte was measured. The grain size distribution was measured using a particle size distribution measurement device using a laser diffraction scattering method (Microtrac method). For the degree of ion conductivity, a sintered body molded into a disc shape and sintered was obtained. The obtained solid electrolyte sintered body was impregnated in water over one day and night to cause the sintered body to incorporate a maximum amount of water, and the content of bound water was adjusted by changing a time during which a heat treatment was performed at a temperature of equal to or greater than 100° C. Then, electrodes were formed through sputtering on both surfaces of the obtained solid electrolyte sintered body, and measurement was performed using an impedance analyzer (manufactured by Solartron Analytical; model No. SI1260) under conditions of an amplitude of 50 mV and a frequency of 0.5 Hz to 1 MHz. The content of bound water was measured using a TDS measurement device (EMD-WA1000 manufactured by ESCO Ltd.). The result is shown in Table 1.

Comparative Examples 1 to 3

Comparative Examples 1 to 3 were different from Example 1 in that crystal phases of the solid electrolyte sintered body were changed. Measurement was performed while the other conditions were set similarly to those in Example 1. The results are shown in Table 1.

As a solid electrolyte sintered body in Comparative Example 1, a solid electrolyte sintered body of a rhombohedral crystal was obtained by producing a mixed solution, adjusting pH, then heating the mixed solution to 120° C., and gradually cooling the mixed solution similarly to Example 1.

A solid electrolyte sintered body in Comparative Example 2 was produced using a flux method. In Comparative Example 2, the solid electrolyte sintered body of a triclinic crystal was obtained by setting a melting temperature to 1200° C. and then gradually cooling the mixed solution.

A solid electrolyte sintered body in Comparative example 3 was also produced using the flux method. In Comparative Example 3, the solid electrolyte sintered body which was a monoclinic crystal was obtained by setting a melting temperature to 900° C. and then gradually cooling the mixed solution.

TABLE 1

| | Main crystal phase | Content of bound water (wt %) | Composition | Grain size distribution D50 (μm) | Ion conductivity (S/cm) |
|---|---|---|---|---|---|
| Example 1 | Cubic crystal | 7.05 | $LiZr_{2.0}P_{3.0}O_{12}$ | 1.4 | $2.10 \times 10^{-5}$ |
| Comparative Example 1 | Rhombohedral crystal | 7.05 | $LiZr_{2.0}P_{3.0}O_{12}$ | 1.4 | $2.36 \times 10^{-6}$ |
| Comparative Example 2 | Triclinic crystal | 7.05 | $LiZr_{2.0}P_{3.0}O_{12}$ | 1.4 | $1.25 \times 10^{-7}$ |
| Comparative Example 3 | Monoclinic crystal | 7.05 | $LiZr_{2.0}P_{3.0}O_{12}$ | 1.4 | $1.12 \times 10^{-8}$ |

The solid electrolyte sintered body in Example 1 that mainly has a cubic crystal has a degree of ion conductivity that is higher than those of the solid electrolyte sintered bodies in Comparative Examples 1 to 3 that mainly had other crystal structures by one digit or more and had excellent ion conductivity.

Examples 2 to 32

Examples 2 to 32 were different from Example 1 in that compositions of the monocrystalline particles were changed. Measurement was performed while the other conditions were set similarly to those in Example 1. The composition was changed by replacing a part of elements. The results are shown in Tables 2 to 4.

Comparative Examples 4 and 5

Comparative Example 4 was different from Example 3 in that a crystal phase of the solid electrolyte sintered body was a rhombohedral crystal. Also, Comparative Example 5 was different from Example 22 in that a crystal phase of the solid electrolyte sintered body is a rhombohedral crystal. Measurement was performed while the other conditions were set similarly to those in Example 1. The results are shown in Tables 2 and 3.

TABLE 2

|  | Main crystal phase | Content of bound water (wt %) | Composition | Grain size distribution D50 (μm) | Ion conductivity (S/cm) |
|---|---|---|---|---|---|
| Example 2 | Cubic crystal | 7.05 | $Li_{1.02}Y_{0.02}Zr_{1.98}P_{3.0}O_{12}$ | 1.4 | $3.21 \times 10^{-5}$ |
| Example 3 | Cubic crystal | 7.05 | $Li_{1.1}Y_{0.1}Zr_{1.9}P_{3.0}O_{12}$ | 1.4 | $5.36 \times 10^{-5}$ |
| Example 4 | Cubic crystal | 7.05 | $Li_{1.18}Y_{0.18}Zr_{1.82}P_{3.0}O_{12}$ | 1.4 | $5.78 \times 10^{-5}$ |
| Example 5 | Cubic crystal | 7.05 | $Li_{1.26}Y_{0.26}Zr_{1.74}P_{3.0}O_{12}$ | 1.4 | $1.40 \times 10^{-4}$ |
| Example 6 | Cubic crystal | 7.05 | $Li_{1.33}Y_{0.33}Zr_{1.67}P_{3.0}O_{12}$ | 1.4 | $8.21 \times 10^{-5}$ |
| Example 7 | Cubic crystal | 7.05 | $Li_{1.7}Y_{0.7}Zr_{1.3}P_{3.0}O_{12}$ | 1.4 | $5.29 \times 10^{-5}$ |
| Example 8 | Cubic crystal | 7.05 | $Li_{2.0}Y_{1.0}Zr_{1.0}P_{3.0}O_{12}$ | 1.4 | $8.21 \times 10^{-6}$ |
| Example 9 | Cubic crystal | 7.05 | $Li_{1.01}Zr_{2.0}Si_{0.01}P_{2.99}O_{12}$ | 1.4 | $5.32 \times 10^{-5}$ |
| Example 10 | Cubic crystal | 7.05 | $Li_{1.1}Zr_{2.0}Si_{0.1}P_{2.9}O_{12}$ | 1.4 | $7.35 \times 10^{-5}$ |
| Example 11 | Cubic crystal | 7.05 | $Li_{1.2}Zr_{2.0}Si_{0.2}P_{2.8}O_{12}$ | 1.4 | $8.10 \times 10^{-6}$ |
| Example 12 | Cubic crystal | 7.05 | $Li_{2.0}Zr_{2.0}Si_{1.0}P_{2.0}O_{12}$ | 1.4 | $1.01 \times 10^{-5}$ |
| Example 13 | Cubic crystal | 7.05 | $Li_{2.5}Zr_{2.0}Si_{1.5}P_{1.5}O_{12}$ | 1.4 | $8.92 \times 10^{-6}$ |
| Comparative Example 4 | Rhombohedral crystal | 7.05 | $Li_{1.1}Y_{0.1}Zr_{1.9}P_{3.0}O_{12}$ | 1.4 | $1.21 \times 10^{-6}$ |

TABLE 3

|  | Main crystal phase | Content of bound water (wt %) | Composition | Grain size distribution D50 (μm) | Ion conductivity (S/cm) |
|---|---|---|---|---|---|
| Example 14 | Cubic crystal | 7.05 | $Li_{0.9}Ca_{0.05}Zr_{2.0}P_{3.0}O_{12}$ | 1.4 | $3.29 \times 10^{-5}$ |
| Example 15 | Cubic crystal | 7.05 | $Li_{0.8}Ca_{0.1}Zr_{2.0}P_{3.0}O_{12}$ | 1.4 | $5.21 \times 10^{-5}$ |
| Example 16 | Cubic crystal | 7.05 | $Li_{0.6}Ca_{0.2}Zr_{2.0}P_{3.0}O_{12}$ | 1.4 | $3.21 \times 10^{-5}$ |
| Example 17 | Cubic crystal | 7.05 | $Li_{0.5}Ca_{0.25}Zr_{2.0}P_{3.0}O_{12}$ | 1.4 | $2.91 \times 10^{-5}$ |
| Example 18 | Cubic crystal | 7.05 | $Li_{0.4}Ca_{0.3}Zr_{2.0}P_{3.0}O_{12}$ | 1.4 | $8.21 \times 10^{-6}$ |
| Example 19 | Cubic crystal | 7.05 | $Li_{0.2}Ca_{0.4}Zr_{2.0}P_{3.0}O_{12}$ | 1.4 | $6.21 \times 10^{-6}$ |
| Example 20 | Cubic crystal | 7.05 | $Li_{1.26}Se_{0.26}Zr_{1.74}P_{3.0}O_{12}$ | 1.4 | $8.41 \times 10^{-5}$ |
| Example 21 | Cubic crystal | 7.05 | $Li_{1.26}Al_{0.26}Zr_{1.74}P_{3.0}O_{12}$ | 1.4 | $7.34 \times 10^{-5}$ |
| Example 22 | Cubic crystal | 7.05 | $Li_{1.2}Ca_{0.1}Zr_{1.9}P_{3.0}O_{12}$ | 1.4 | $1.14 \times 10^{-4}$ |
| Example 23 | Cubic crystal | 7.05 | $Li_{1.52}Ca_{0.26}Zr_{1.74}P_{3.0}O_{12}$ | 1.4 | $8.92 \times 10^{-5}$ |
| Example 24 | Cubic crystal | 7.05 | $Li_{1.52}Mg_{0.26}Zr_{1.74}P_{3.0}O_{12}$ | 1.4 | $6.31 \times 10^{-6}$ |
| Example 25 | Cubic crystal | 7.05 | $Li_{1.52}Sr_{0.26}Zr_{1.74}P_{3.0}O_{12}$ | 1.4 | $7.63 \times 10^{-5}$ |
| Example 26 | Cubic crystal | 7.05 | $Li_{1.52}Ba_{0.26}Zr_{1.74}P_{3.0}O_{12}$ | 1.4 | $5.90 \times 10^{-5}$ |
| Example 27 | Cubic crystal | 7.05 | $Li_{0.74}Nb_{0.26}Zr_{1.74}P_{3.0}O_{12}$ | 1.4 | $1.81 \times 10^{-4}$ |
| Comparative Example 5 | Rhombohedral crystal | 7.05 | $Li_{1.2}Ca_{0.1}Zr_{1.9}P_{3.0}O_{12}$ | 1.4 | $4.20 \times 10^{-6}$ |

TABLE 4

|  | Main crystal phase | Content of bound water (wt %) | Composition | Grain size distribution D50 (μm) | Ion conductivity (S/cm) |
|---|---|---|---|---|---|
| Example 28 | Cubic crystal | 7.05 | $Li_{1.4}Zr_{2.0}B_{0.2}P_{2.8}O_{12}$ | 1.4 | $6.11 \times 10^{-5}$ |
| Example 29 | Cubic crystal | 7.05 | $Li_{0.8}Zr_{2.0}Mo_{0.2}P_{2.8}O_{12}$ | 1.4 | $9.35 \times 10^{-5}$ |
| Example 30 | Cubic crystal | 7.05 | $Li_{0.8}Mg_{0.1}Zr_{2.0}P_{3.0}O_{12}$ | 1.4 | $1.36 \times 10^{-5}$ |
| Example 31 | Cubic crystal | 7.05 | $Li_{0.8}Sr_{0.1}Zr_{2.0}P_{3.0}O_{12}$ | 1.4 | $6.22 \times 10^{-5}$ |
| Example 32 | Cubic crystal | 7.05 | $Li_{0.8}Ba_{0.1}Zr_{2.0}P_{3.0}O_{12}$ | 1.4 | $2.81 \times 10^{-5}$ |

As described in Examples 2 to 32, the solid electrolyte sintered bodies of cubic crystals still had excellent ion conductivity even after the compositions were changed. Also, in comparison between Example 3 and Comparative Example 4 and between Example 22 and Comparative Example 5, degrees of ion conductivity were enhanced by the crystal phases being cubic crystals in any of the cases, and the solid electrolyte sintered bodies with excellent ion conductivities were obtained.

Examples 33 to 42

Examples 33 to 42 were different from Example 1 only in that the amounts of bound water contained in the solid electrolyte sintered bodies were changed. Measurement was performed while the other conditions were set similarly to those in Example 1. The results are shown in Table 5.

TABLE 5

| | Main crystal phase | Content of bound water (wt %) | Composition | Grain size distribution D50 (μm) | Ion conductivity (S/cm) |
|---|---|---|---|---|---|
| Example 33 | Cubic crystal | 0 | $LiZr_{2.0}P_{3.0}O_{12}$ | 1.4 | $2.44 \times 10^{-6}$ |
| Example 34 | Cubic crystal | 0.01 | $LiZr_{2.0}P_{3.0}O_{12}$ | 1.4 | $1.10 \times 10^{-5}$ |
| Example 35 | Cubic crystal | 0.38 | $LiZr_{2.0}P_{3.0}O_{12}$ | 1.4 | $1.33 \times 10^{-5}$ |
| Example 36 | Cubic crystal | 1.86 | $LiZr_{2.0}P_{3.0}O_{12}$ | 1.4 | $1.40 \times 10^{-5}$ |
| Example 37 | Cubic crystal | 3.66 | $LiZr_{2.0}P_{3.0}O_{12}$ | 1.4 | $1.64 \times 10^{-5}$ |
| Example 38 | Cubic crystal | 6.23 | $LiZr_{2.0}P_{3.0}O_{12}$ | 1.4 | $2.01 \times 10^{-5}$ |
| Example 1 | Cubic crystal | 7.05 | $LiZr_{2.0}P_{3.0}O_{12}$ | 1.4 | $2.10 \times 10^{-5}$ |
| Example 39 | Cubic crystal | 10.22 | $LiZr_{2.0}P_{3.0}O_{12}$ | 1.4 | $1.21 \times 10^{-5}$ |
| Example 40 | Cubic crystal | 18.55 | $LiZr_{2.0}P_{3.0}O_{12}$ | 1.4 | $8.92 \times 10^{-6}$ |
| Example 41 | Cubic crystal | 20.99 | $LiZr_{2.0}P_{3.0}O_{12}$ | 1.4 | $5.92 \times 10^{-6}$ |
| Example 42 | Cubic crystal | 23.29 | $LiZr_{2.0}P_{3.0}O_{12}$ | 1.4 | $4.28 \times 10^{-6}$ |

All the solid electrolyte sintered bodies in Examples 33 to 42 had superior ion conductivities to those in Comparative Examples 1 to 3 in all of which the crystal phases were different. In Example 1 and Examples 34 to 40 in which the content of bound water fell within a range of equal to or greater than 0.01% by mass and equal to or less than 20% by mass, values of the degrees of ion conductivity were particularly large, and particularly excellent ion conductivities were achieved.

Examples 43 to 47

Examples 43 to 47 were different from Example 1 only in that grain size distribution of particles that were included in the solid electrolyte sintered bodies was changed. The grain size distribution of the particles that were included in the solid electrolyte sintered bodies was prepared by pulverizing the solid electrolytes and filtering the solid electrolytes. Measurement was performed while the other conditions were set similarly to those in Example 1. The results are shown in Table 6.

TABLE 6

| | Main crystal phase | Content of bound water (wt %) | Composition | Grain size distribution D50 (μm) | Ion conductivity (S/cm) |
|---|---|---|---|---|---|
| Example 43 | Cubic crystal | 7.05 | $LiZr_{2.0}P_{3.0}O_{12}$ | 0.32 | $3.31 \times 10^{-5}$ |
| Example 1 | Cubic crystal | 7.05 | $LiZr_{2.0}P_{3.0}O_{12}$ | 1.4 | $2.10 \times 10^{-5}$ |
| Example 44 | Cubic crystal | 7.05 | $LiZr_{2.0}P_{3.0}O_{12}$ | 2.6 | $1.16 \times 10^{-5}$ |
| Example 45 | Cubic crystal | 7.05 | $LiZr_{2.0}P_{3.0}O_{12}$ | 8.6 | $9.29 \times 10^{-6}$ |
| Example 46 | Cubic crystal | 7.05 | $LiZr_{2.0}P_{3.0}O_{12}$ | 12.3 | $4.47 \times 10^{-6}$ |
| Example 47 | Cubic crystal | 7.05 | $LiZr_{2.0}P_{3.0}O_{12}$ | 15.2 | $3.40 \times 10^{-6}$ |

All the solid electrolyte sintered bodies in Example 1 and Examples 44 to 47 had excellent ion conductivities. In Example 1 and Examples 43 to 45 in which the value of D50 fell within a range of equal to or greater than 0.1 μm and equal to or less than 10 μm, particularly excellent ion conductivities were achieved.

Example 48

Example 48 was different from Example 1 in that Hf was used instead of Zr in $LiZr_2(PO_4)_3$ and the composition of the solid electrolyte was set to $LiHf_2(PO_4)_3$. For a solid electrolyte in Example 48, each of $LiOH \cdot H_2O$, $HfCl_4$, and $NH_4(H_2PO_4)$ was weighed at a weighing ratio and was dissolved in water. The respective solutions were mixed, were heated to 120° after pH was adjusted, and were gradually cooled. As a result, it was confirmed that a crystal phase of the solid electrolyte represented as $LiHf_2(PO_4)_3$ was a cubic crystal. Also, the degree of ion conductivity of the solid electrolyte sintered body was measured similarly to Example 1. As a result, the degree of ion conductivity was $3.15 \times 10^{-5}$ S/cm. The degree of ion conductivity in a case in which the crystal phase of $LiHf_2(PO_4)_3$ was a rhombohedral crystal was $6.5 \times 10^{-6}$ S/cm, and it was confirmed that the degree of ion conductivity was enhanced by the crystal phase of $LiHf_2(PO_4)_3$ being a tetragonal crystal.

All-solid secondary batteries were produced using the solid electrolytes in Example 1, Example 5, Example 11, Example 22, Example 27, and Example 43, Comparative Example 1, and Comparative Example 5 among the aforementioned solid electrolytes. $Li_3V_2(PO_4)_3$ was used as a positive electrode active material, and $Li_4Ti_5O_{12}$ was used as a negative electrode active material. Then, the discharge capacities of the all-solid secondary batteries were measured. The discharge capacities of the all-solid secondary batteries were measured at a constant current of 2 μA. Cutoff voltages during charging and discharging were set to 2.8 V and 1.8 V, respectively. The results are shown in Table 7.

TABLE 7

| | Main crystal phase | Content of bound water (wt %) | Composition | Grain size distribution D50 (μm) | Discharge capacity (μAh) |
|---|---|---|---|---|---|
| Example 1 | Cubic crystal | 7.05 | $LiZr_{2.0}P_{3.0}O_{12}$ | 1.4 | 9.9 |
| Example 5 | Cubic crystal | 7.05 | $Li_{1.26}Y_{0.26}Zr_{1.74}P_{3.0}O_{12}$ | 1.4 | 12.2 |
| Example 11 | Cubic crystal | 7.05 | $Li_{1.2}Yr_{2.0}Si_{0.2}P_{2.8}O_{12}$ | 1.4 | 11.1 |
| Example 22 | Cubic crystal | 7.05 | $Li_{1.2}Ca_{0.1}Zr_{1.9}P_{3.0}O_{12}$ | 1.4 | 12.1 |
| Example 27 | Cubic crystal | 7.05 | $Li_{0.26}Nb_{0.26}Zr_{1.74}P_{3.0}O_{12}$ | 1.4 | 12.5 |
| Example 43 | Cubic crystal | 7.05 | $LiZr_{2.0}P_{3.0}O_{12}$ | 0.32 | 10.2 |
| Comparative Example 1 | Rhombohedral crystal | 7.05 | $LiZr_{2.0}P_{3.0}O_{12}$ | 1.4 | 4.7 |
| Comparative Example 5 | Rhombohedral crystal | 7.05 | $Li_{1.2}Ca_{0.1}Zr_{1.9}P_{3.0}O_{12}$ | 1.2 | 0.8 |

In comparison between Example 1 and Comparative Example 1 and between Example 22 and Comparative Example 5, it was recognized that the discharge capacity was enhanced by the solid electrolyte being a cubic crystal. Also, all-solid batteries with high capacity was obtained regardless of a change in composition, grain size distribution, and the like.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
4 Layered body
5 First external terminal
6 Second external terminal
30 Monocrystalline particle
31 Random shape particle
P Path
G Grain
Gs Grain boundary

What is claimed is:

1. A solid electrolyte comprising:
a lithium and phosphorus-containing compound having mainly a cubic crystal structure and in the form of monocrystalline particles,
wherein the lithium and phosphorus-containing compound is represented as:

$$Li_xM1_yM2_zM3_wP_{3-w}O_{12} \quad (1),$$

Formula (1) satisfies $0<x\leq3$, $0\leq y<2$, $0<z\leq2$, and $0\leq w<3$,
M1 represents at least one selected from the group consisting of Mg, Ca, Sr, Ba, V, Nb, Mn, Co, Ni, Cu, Ag, Ga, Al, In, Sc, and Y,
M2 represents at least one selected from the group consisting of Zr and Hf, and
M3 represents at least one selected from the group consisting of Si, B, S, V, Mo, and W.

2. The solid electrolyte according to claim 1, further comprising:
equal to or greater than 0.01% by mass and equal to or less than 20% by mass of bound water.

3. The solid electrolyte according to claim 1, wherein a measurement value (D50) obtained through particle size distribution measurement is equal to or greater than 0.1 μm and equal to or less than 10 μm.

4. An all-solid secondary battery comprising:
the solid electrolyte according to claim 1.

5. The all-solid secondary battery according to claim 4, wherein a relative density of a pair of electrode layers and a solid electrolyte layer with the solid electrolyte that is provided between the pair of electrode layers is equal to or greater than 80%.

6. The solid electrolyte according to claim 2, wherein a measurement value (D50) obtained through particle size distribution measurement is equal to or greater than 0.1 μm and equal to or less than 10 μm.

7. An all-solid secondary battery comprising:
the solid electrolyte according to claim 2.

8. An all-solid secondary battery comprising:
the solid electrolyte according to claim 3.

9. An all-solid secondary battery comprising:
the solid electrolyte according to claim 6.

10. The all-solid secondary battery according to claim 7, wherein a relative density of a pair of electrode layers and a solid electrolyte layer with the solid electrolyte that is provided between the pair of electrode layers is equal to or greater than 80%.

11. The all-solid secondary battery according to claim 8, wherein a relative density of a pair of electrode layers and a solid electrolyte layer with the solid electrolyte that is provided between the pair of electrode layers is equal to or greater than 80%.

* * * * *